No. 827,334. PATENTED JULY 31, 1906.
A. E. UNDERWOOD & A. D. MOWERS.
MEANS FOR CLEANING PLOW COLTERS.
APPLICATION FILED MAR. 16, 1906.
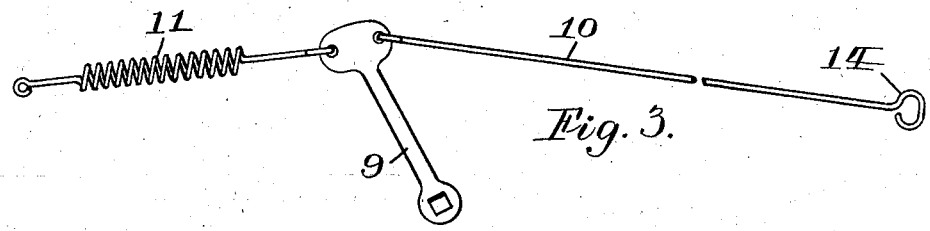
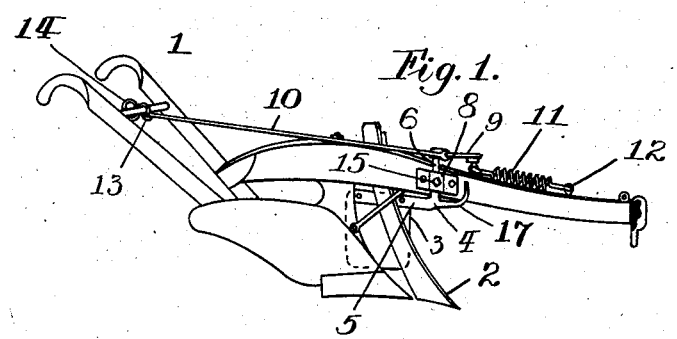
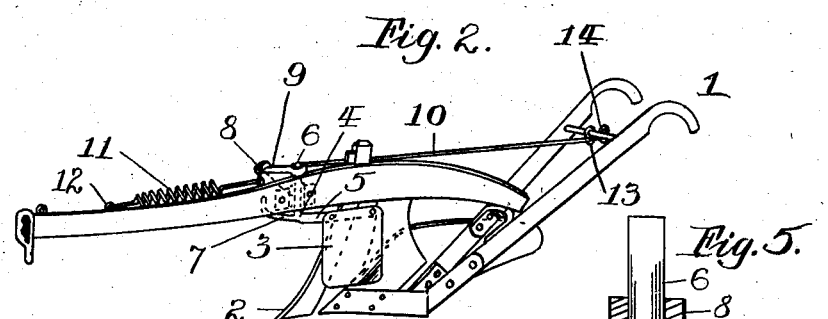
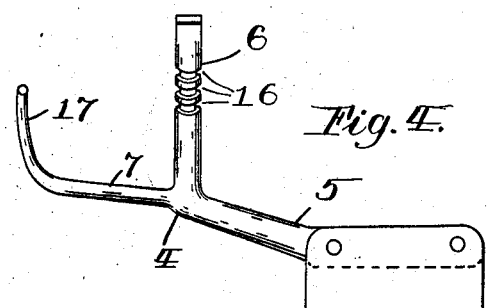
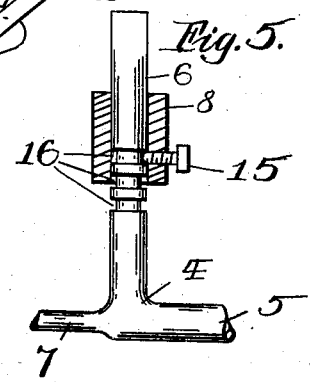
Witnesses:
E. M. Boesel.
H. L. Fischer.
Inventors:
Albert E. Underwood
Arthur D. Mowers
by John E. Stryker
Attorney.

UNITED STATES PATENT OFFICE.

ALBERT E. UNDERWOOD, OF BEMIDJI, AND ARTHUR D. MOWERS, OF SOLWAY, MINNESOTA.

MEANS FOR CLEANING PLOW-COLTERS.

No. 827,334.  Specification of Letters Patent.  Patented July 31, 1906.

Application filed March 16, 1906. Serial No. 306,453.

*To all whom it may concern:*

Be it known that we, ALBERT E. UNDERWOOD, residing at Bemidji, and ARTHUR D. MOWERS, residing at Solway, in the county of Beltrami and State of Minnesota, citizens of the United States, have invented new and useful Means for Cleaning Plow-Colters, of which the following is a specification.

Our invention relates to means for cleaning plow-colters, and has for its object the prevention of the collection of debris upon the plow when used in brush-land, stubble-fields, and other similar places where the work of plowing is impeded by the presence of vegetable growth. In such situations the rolling colter will not operate satisfactorily, and in the absence of some means for clearing litter away from in front of the plow it is frequently necessary to stop plowing to remove constantly-accumulating piles of litter or to employ an additional laborer for the purpose of removing such accumulations, which obstruct the movement of the plow.

In the accompanying drawings, forming part of this specification, Figure 1 is a perspective view of a plow with our improved cleaner attached. Fig. 2 is a perspective view of the opposite side of the plow and cleaner. Fig. 3 is a detail showing the means for manipulating the cleaner. Fig. 4 is a detail showing the blade and shank of the cleaner, and Fig. 5 is a detail showing the shank of the cleaner with the means for journaling and adjusting the same on the beam of the plow.

In the drawings, 1 is a plow, to which is attached a colter 2, both of ordinary construction. The blade 3 of the cleaner is riveted or attached by other suitable means to the shank 4. This shank is constructed with an offset 5, adapted to pass under the beam of the plow, and a vertical shaft 6, adapted to be journaled upon the plow-beam. The shank is also provided with an arm 7, hereinafter more fully described. The shaft 6 is journaled in the bracket or box 8, which is bolted or otherwise suitably attached to the plow-beam. Rigidly attached to the top of the shaft is a lever-arm 9, to which is connected a rod 10 and a spiral tension-spring 11. The opposite end of the spring from that connected with the lever-arm is fixed to the plow-beam near its forward end by means of an eyebolt 12. The rear end of the rod 10 is slidably supported upon or near the plow-handles by suitable means—as, for example, a clip 13 upon the cross-bar of the handles—and at its rear end the rod 10 is provided with a suitable grip 14. The height of the blade 3 from the ground may be adjusted by means of a set-screw 15 in the bracket 8, said screw being adapted to engage either of the grooves 16 in the shaft 6. The upper end 17 of the arm 7 is adapted in normal position to lie close to the plow-beam on the side opposite from that on which the cleaner-blade is placed, and this arm thus tends to hold brush and other debris away from the plow-beam, and when the cleaner is operated, as hereinafter described, to clear the plow on that side from such debris.

In normal position the cleaner-blade 3 is held substantially parallel with the colter and moldboard of the plow by the action of the spring 11, and by the same means the end 17 of the arm 7 is held adjacent to the plow-beam. Whenever brush or other debris accumulates in front of the colter in sufficient quantities to obstruct the working of the plow, the rod 10 is drawn toward the plowman by means of the grip 14, and this movement of the rod turns the lever against the action of the spring 11 and throws the blade 3 outward into a position substantially at right angles to the colter and moldboard, thus thrusting the accumulation of brush away from the furrow, while the same movement swings the arm 7 outward on the opposite side of the plow and thrusts back any brush which may have been pressed upward toward the beam on that side. When the grip 14 is released, the tension of the spring 11 returns the blade 3 and arm 7 to normal position.

Having described our invention, what we claim as new, and desire to protect by Letters Patent, is—

1. In a device of the class described, the combination with a plow having a beam of a cleaner journaled upon the beam and provided with a lever-arm, a spring and rod respectively adapted to hold the cleaner in a position substantially parallel with the plow-beam and to turn it at an angle with said beam, both said spring and rod being connected with said lever-arm and plow-beam.

2. In a device of the class described, the combination with a plow of a colter-cleaner comprising a blade, a shaft journaled on the plow-beam and adapted to support said blade, a spring adapted to hold the blade substantially parallel with the plowshare, and means for revolving the shaft and turning the blade.

3. A device of the class described, comprising a blade attached to a shaft, said shaft being provided with a lever-arm to which is connected a spring and draw-rod adapted to turn the blade, all mounted upon a plow, for the purposes specified.

4. A device of the class described, comprising a plow, a shank adapted to be journaled upon the plow and provided with a cleaning-blade and guard-arm and means for holding the blade and arm in normal position and for swinging them outward upon opposite sides of the plow.

5. In a device of the class described, the combination with a plow of a colter-cleaner journaled upon the plow-beam and provided with a lever-arm, a spring attached to the arm and adapted to hold the cleaner in normal position, and a rod, also attached to said arm and adapted to turn the cleaner in its journal-bearing.

6. A device of the class described, comprising a plow, a shaft adapted to be journaled upon the plow and provided with a cleaning-blade, means attached to the forward end of the plow-beam for holding the blade in normal position and means for turning it outward therefrom.

In testimony whereof we have signed our names to this specification in the presence of two subscribing witnesses.

ALBERT E. UNDERWOOD.
ARTHUR D. MOWERS.

Witnesses:
RAY DICKINSON,
THOS. J. BURKE